US005668620A

United States Patent [19]
Kurtin et al.

[11] Patent Number: 5,668,620
[45] Date of Patent: Sep. 16, 1997

[54] VARIABLE FOCAL LENGTH LENSES WHICH HAVE AN ARBITRARILY SHAPED PERIPHERY

[76] Inventors: Stephen Kurtin, 3835 Kingswood Rd., Sherman Oaks, Calif. 91403; Daniel E. Fedele, 3007 N. Arlington Ave., Simi Valley, Calif. 93063; Saul Epstein, 14558 Deervale Pl., Sherman Oaks, Calif. 91403

[21] Appl. No.: 226,344

[22] Filed: Apr. 12, 1994

[51] Int. Cl.$^6$ ................................ G02C 1/00; G02B 1/06
[52] U.S. Cl. .......................... 351/158; 359/665; 359/666
[58] Field of Search ................................. 359/666, 665, 359/832, 722, 672; 351/41, 158

[56] References Cited

U.S. PATENT DOCUMENTS

| | | | |
|---|---|---|---|
| 3,598,479 | 8/1971 | Wright | 351/159 |
| 4,261,655 | 4/1981 | Honigsbaum | 351/41 |
| 4,913,536 | 4/1990 | Barnea | 350/419 |
| 5,138,494 | 8/1992 | Kurtin | 359/666 |

FOREIGN PATENT DOCUMENTS 258325  9/1926  United Kingdom .

Primary Examiner—Hung X. Dang
Attorney, Agent, or Firm—Saul Epstein

[57] ABSTRACT

A variable focal length lens whose peripheral shape can be arbitrarily specified, for use in spectacles, which includes a rigid lens to provide the wearer's distance correction, and a liquid-filled lens bounded by a stretched distensible elastomeric membrane to provide a variable near addition. The liquid, which has a fixed volume, is stored in the field of view between the elastomeric membrane and the rigid lens. Variation of the optical power of the liquid filled lens is achieved by displacement of a membrane support to which the outer periphery of the stretched elastomeric membrane is attached. The shape of the distended membrane is kept substantially spherical, despite the circumference of the membrane being non-circular, by making the free area of the membrane circular. This is accomplished by supporting the membrane on a transparent spacing member which has substantially the same refractive index as the liquid and which includes a circular opening which defines the free area of the membrane. A pair of spectacles is comprised of two variable focal length lenses mounted to a frame with an actuator for adjusting their focal lengths mounted on the frame between the lenses. The actuator is mechanically coupled to the lenses by point contacts which prevent twisting couples from being created in the lens structures.

9 Claims, 3 Drawing Sheets

5,668,620

VARIABLE FOCAL LENGTH LENSES WHICH HAVE AN ARBITRARILY SHAPED PERIPHERY

BACKGROUND OF THE INVENTION

This invention relates to spectacles which use variable focal length lenses. There are many other uses for such lenses, but there is a particular need for them as spectacle lenses. This need arises as people get older (generally about the age of forty five) because the lens in the human eye becomes incapable of sufficient accommodation to focus on near objects. After the onset of this condition of limited focal accommodation, called presbyopia, a single set of fixed focus spectacles will be found to be unsatisfactory for both distant and near vision, irrespective of the wearer's general visual acuity. Whatever correction (if any) may be required to correct a person's vision for distance, an additional amount of optical power (up to about three diopters) will be found to be required to correct that person's eyesight for near vision. The required "near addition" generally does not involve an astigmatic component.

The usual solution to this problem is to fit persons suffering from presbyopia with spectacles having bifocal lenses. In the most common form of bifocal lens, the upper part is ground to provide the wearer with the proper correction (if any is needed) for distance vision, and the lower part is ground with the same correction plus a relatively small near addition, usually amounting to no more than a few diopters of additional optical power. Using bifocal lenses in a pair of spectacles allows a person to see distant objects clearly by looking straight ahead, and to see close objects clearly by looking downward.

The bifocal solution is not entirely satisfactory for at least three reasons. Firstly, many people have difficulty in adapting to bifocals; secondly, there is often the need to see near objects which are on a level with, or above, the wearer; and finally, there is usually an intermediate distance range within which which neither part of the lens is satisfactory. Trifocals or progressive multifocal lenses are used to help alleviate this last problem, but the first two difficulties remain, and in any event, the in-focus field of view may be more limited than is desired. The foregoing problem was addressed in a prior patent issued to one of the present inventors, U.S. Pat. No. 5,138,494. This patent discloses a continuously variable focal length lens which can be adjusted by the wearer to focus on any object, irrespective of its distance from the wearer.

In the aforementioned prior patent, a liquid-filled variable focal length lens was disclosed which includes a distensible transparent membrane spaced from a rigid lens, with the space between them filled with a liquid having a relatively high refractive index. The membrane is bonded to a membrane support, and the peripheries of the rigid lens and the membrane support are connected with a flexible sealing member. The rigid lens, the membrane, and the sealing member define a substantially fixed volume for the liquid filling. Changing the spacing between the membrane support and the rigid lens in such a structure causes the membrane to assume a curved form, either increasing the power of the lens or decreasing it, depending on the direction of the change in spacing. If the periphery of the membrane is circular, its shape, when distended, will be essentially spherical, and little or no optical distortion will be encountered in use. However, as noted, one substantial use of the lenses described in the previous patent is in variable focus spectacles. In spectacles, for reasons of style, lens shapes other than circular are often desired. It has been found that in such cases, depending on the extent of the non-circularity of the lenses, the membrane shape may deviate significantly from the desired spherical shape, and greater than desired optical distortions may be encountered.

It is therefore an object of the present invention to enable the production of a liquid filled variable focal length lens wherein optical distortion otherwise arising from non-circularity of the lens may be minimized.

It is a further object of the present invention to enable the production Of spectacles using such variable focal length lenses.

SUMMARY OF THE INVENTION

The present invention uses a structure similar in many respects to the structure disclosed in the aforementioned '494 patent. Hence, the disclosures of U.S. Pat. No. 5,138, 494 are incorporated herein by reference. The structures illustrated in FIGS. 5–9 of that patent are particularly relevant hereto. The presently preferred embodiment of this invention utilizes a structure similar to that described in connection with FIG. 9 of the prior invention, modified so as to minimize distortions which might otherwise arise from the use of a membrane having a noncircular periphery. As was noted in the previous section, the usual spectacle prescription for a person suffering from presbyopia (i.e., most people over the age of forty five) includes a distance correction to correct his or her vision at infinity (including, if needed, spherical and astigmatic corrections) plus an additional correction for close vision. The additional correction for close vision is almost always only spherical. Both the prior invention and the present invention basically involve means for providing close vision correction by varying the spherical power of the lens. The present invention is an improvement over the previous invention in that it minimizes distortions which may arise if the shape of the lenses is other than circular.

As noted above, the '494 patent discloses a liquid filled variable focus lens in which a transparent membrane mounted on a membrane support is moved in such a way that the membrane distends to change the optical power of the lens. Also as noted above, depending on the shape of the periphery of the membrane, the distended surface may not be spherical. Hence, the present invention provides means to minimize any variation from sphericity as the optical power is changed.

In the present invention, the free area of the distensible membrane is circular irrespective of the peripheral shape of the membrane support. This is accomplished by making the membrane support transparent, and providing a circular opening therein which defines the free area of the membrane. Since the free area of the distensible membrane is circular, its distensions are spherical, and do not cause optical distortions. Also, the membrane support is made of a material which has substantially the same index of refraction as the liquid filling. This renders the support substantially invisible, and hence it does not detract from the appearance or styling of the glasses.

DETAILED DESCRIPTION OF THE INVENTION

Figure 1:
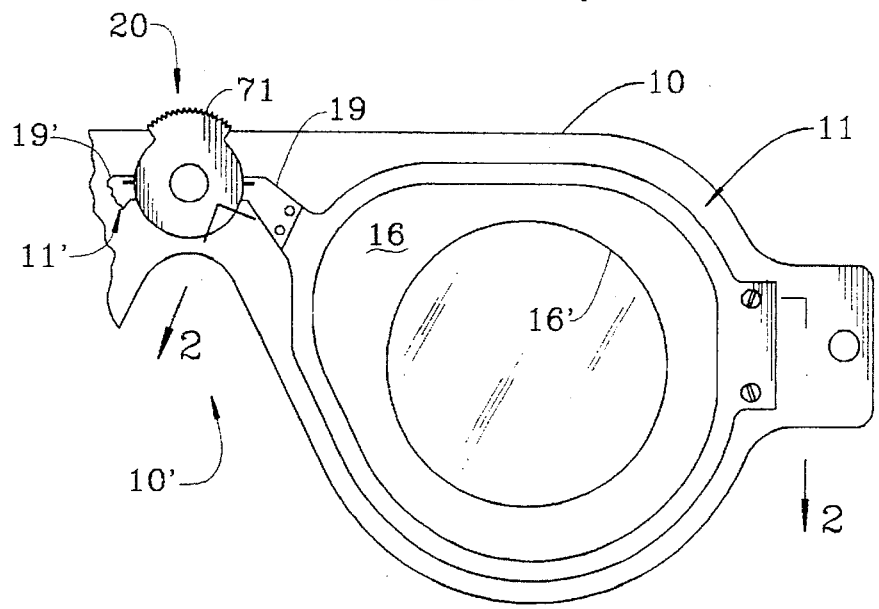
FIG. 1 is a rear view (i.e., from the wearer's side) of a portion of a pair of spectacles using lenses according to a first embodiment of the present invention.

FIG. 1 depicts a pair of spectacles which include variable focus lenses according to the present invention. Only the right lens is shown (the view being from the wearer's side of the spectacles), plus a small portion of the adjusting tab (19') of the left lens, sufficient to show the relationships between the parts. The following description will generally refer to only a single lens but, of course, it will be understood that there are actually two lenses in a pair of spectacles.

Basically, the invented variable focus lens can be thought of as a fixed rigid lens plus a liquid lens which has a variable power. The liquid lens is bounded on one side by the rigid lens, and on the other by a distensible transparent membrane, the space between the membrane and the rigid lens being filled with a transparent liquid. If the rigid lens is moved closer to the membrane, the membrane will distend, becoming convex and increasing the optical power of the lens assembly. Conversely, if the lens is moved away from the membrane, the membrane will become concave, reducing the optical power of the assembly. The present invention involves means for assuring that the distension of the membrane is spherical when the shape of the membrane support is not circular.

Figure 2:
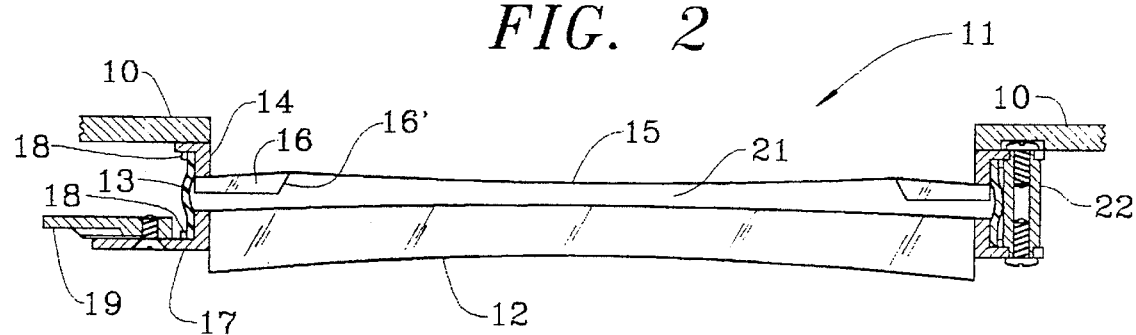
FIG. 2 is a cross sectional view of the right eye lens from the spectacles shown in FIG. 1, taken at 2—2 of FIG. 1, and showing the lens adjusted for distance viewing.
Figure 3:
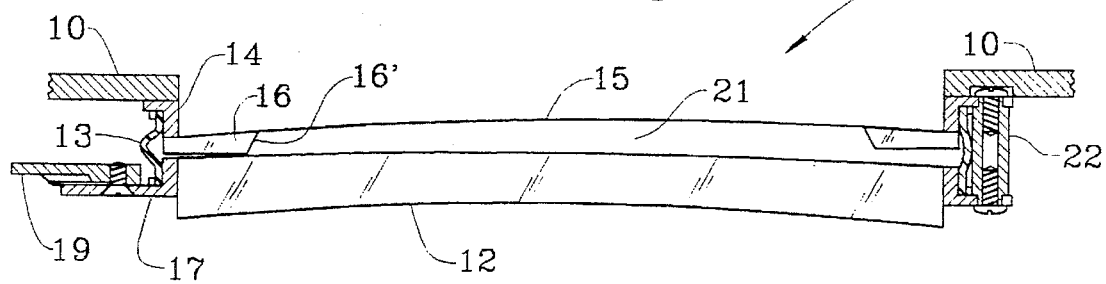
FIG. 3 is a cross sectional view of the lens shown in FIG. 1, taken at the same section as FIG. 2, but showing the lens adjusted to focus on a near object.

As seen in FIG. 1, the spectacles include a frame 10 to which temples (not shown) are attached. The frame is generally symmetrical about a nasal region 10' A pair of lens assemblies 11 and 11' (a right hand and a left hand assembly) are attached to the frame 10 by screws or other means (not shown) on either side of the nasal region 10' Only the adjusting tab 19' of the left hand assembly 11' can be seen in FIG. 1. The lens assemblies are positioned so that the wearer's left eye sees through assembly 11', and his or her right eye sees through assembly 11. FIGS. 2 and 3 are cross sectional views of the right eye lens assembly 11, the assembly of FIG. 2 being adjusted for distance viewing, and the assembly of FIG. 3 being adjusted for near viewing.

Front ring 14 of the lens assembly is the member attached to frame 10. Distensible membrane 15, under radial tension, is placed between front ring 14 and membrane support 16, and the three items cemented, or otherwise fastened together. The membrane support may have any peripheral shape as desired, but irrespective of its peripheral shape, the central portion includes a substantially circular opening 16' which defines the free area of membrane 15. The opening 16' as seen in FIGS. 2 and 3 extends completely through the membrane support 16, however, the opening need only be deep enough to define the desired free area of the membrane. If the opening 16' does not extend through the thickness of the membrane support, it will be necessary to provide some other passage (such as a small hole) for the filling liquid to flow from one side of the membrane support to the other.

A rigid lens 12 is cemented, or otherwise attached, to rear ring 17, and is spaced from frame 10 by flex hinges 22 and actuator 20, which will be described below. A flexible seal 13, preferably made of silicone rubber, is sealed to the rear ring 17, and also to front ring 14. As shown in the drawings, seal 13 is held in place by compression rings 18, but cementing or other sealing methods may be used if desired.

The view of membrane support 16 with its central opening 16' as shown in FIG. 1 is through rigid lens 12. Because, as will be discussed below, the rigid lens, the membrane support, the membrane, and the transparent liquid filling preferably all have substantially the same index of refraction, the membrane support actually will be difficult to see. For explanatory purposes, however, this element is shown in FIG. 1 as if it were clearly visible.

The surface of membrane support 16 which contacts membrane 15 is preferably sufficiently convex so that membrane 15 will remain in contact with the edge of opening 16', even when the membrane is distended to its maximum convexity. If such construction is used, membrane 15 need be attached to the membrane support only at its periphery. If the convexity of the top surface of the membrane support is made less than the amount which will assure contact between the membrane 15 and the edge of opening 16' at maximum distension, membrane 15 must be attached to the membrane support 16 around the periphery of opening 16', as by cementing, to assure that the free area of the membrane is circular, even at maximum distension. If cemented, the cement used should be transparent and index-matched so as to render it invisible in use. The construction with an adequately convex top surface of the membrane support is presently preferred, since it avoids the need to attach the membrane to membrane support 16 in such a way that the interface is invisible. As will be appreciated by those skilled in the art, while it may be possible to fasten the membrane to the membrane support so as to achieve the desired results, avoiding this step is advantageous.

The membrane 15 is comprised of a thin transparent distensible plastic film such as saran. The enclosed volume defined by membrane 15, membrane support 16, front ring 14, seal 13, rear ring 17, and rigid lens 12 is filled with a transparent liquid 21. The indexes of refraction of the liquid filling, the membrane support, the membrane and the rigid lens are all preferably the same or nearly the same.

The rear ring 17 is attached to frame 10 via a pair of flex "hinges" 22, one of which can be seen in FIGS. 2 and 3. Each of the hinges 22 is preferably comprised of a plastic tube which is relatively weak in bending so that the angle between the rear ring 17 and the front ring 14 can be varied as desired. Other types of hinges can also be used, if desired.

An adjusting tab 19 is attached to the rear ring 17, and extends outward from it at a point remote from the hinges. The adjusting tabs 19 and 19' (from both lenses of the spectacles, as can be seen in FIG. 1) are engaged by an actuator 20 located just above the nose of the wearer. The actuator 20 allows the wearer to adjust the distance between the front ring 14 and the rear ring 17 adjacent to the actuator. This causes a change in the angle between front ring 14 and rear ring 17, changing the volume between the two rings. Since the liquid 21 is sensibly incompressible, membrane 15, the softest member enclosing the liquid, distends as needed to enclose a fixed volume. Flexible seal 13 is constructed so that the volume change due to its motion is relatively low. Moving the adjusting tabs 19 and 19' toward the frame 10 causes the membranes 15 to bulge outward, resulting in a convex membrane surface and an increased optical power.

Assuming that the index of refraction of liquid 21 is equal to that of the rigid lens 12, the optical power of the lens assembly is determined by the refractive index and the shapes of the membrane 15 and the outer (rear) surface of rigid lens 12. The shape of the interface between the liquid 21 and lens 12 will have no effect. The shape of membrane 15 as shown in FIG. 2 is concave for purposes of illustration and explanation. Since FIG. 2 is intended to illustrate a distance viewing configuration, the outer (i.e., rear) surface of lens 12 would be ground so that, in combination with the concave membrane, the wearer's prescription for distance viewing is achieved. Adjusting actuator 20 so that adjusting tabs 19 and 19' are moved closer to frame 10 causes the membrane to become convex, adding to the power of the lens assembly so that the wearer can focus on nearer objects.

Membrane 15 need not be concave in the distance viewing configuration, as shown, but could, for example, be flat (or even convex, if desired). The outer surface of lens 12, in such a case, should be ground to provide the wearer's distance prescription with whatever shape membrane is chosen. It is believed to be advantageous to use a concave membrane shape, as shown, for the distance configuration since it is then possible to minimize the membrane distension, and correspondingly the actuation forces, by causing the membrane shape go from concave, through flat, to convex as the spectacles are adjusted from distance to near viewing.

Since the membrane support is transparent, and has substantially the same refractive index as does the liquid 21, it tends to be invisible to both the wearer and to persons observing the wearer, and there will be no degradation of the stylistic effect sought to be achieved by whatever outline shape is chosen. At the same time, because the free area of the membrane is circular, the distensions of the membrane will be spherical, and there will be no significant distortion of the images seen by the wearer over a wide solid angle of view.

It may be noted, that as described herein, the membrane support 16 is fastened to the spectacles frame, while the rigid lens is moved with respect thereto. It will be understood by those skilled in the art that this construction is only a matter of convenience for purposes of explanation and illustration, and that the reverse construction whereby the rigid lens is attached to the frame, and the membrane support is moved with respect thereto, would achieve similar results.

Figure 4:
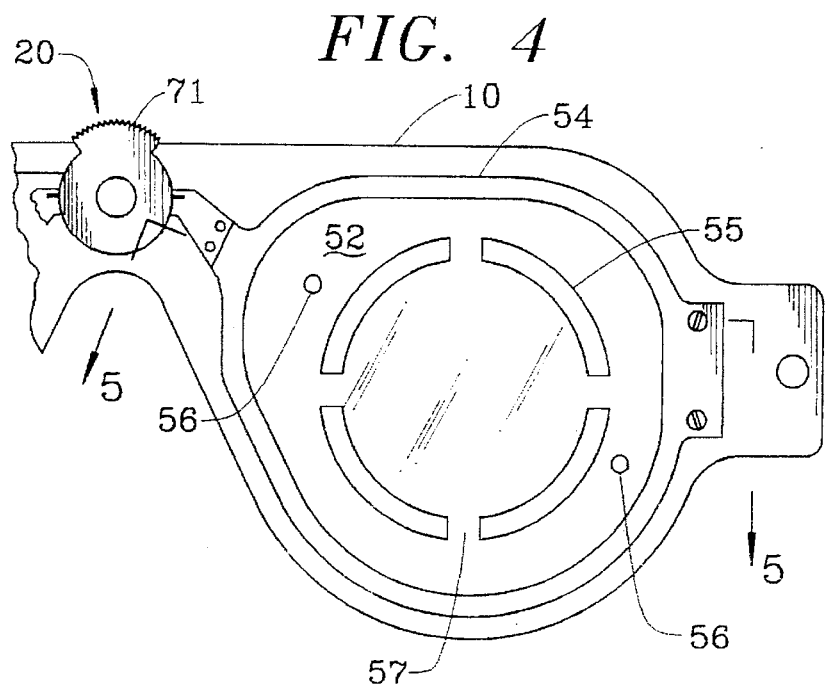
FIG. 4 is a rear view (i.e., from the wearer's side) of a portion of a pair of spectacles using lenses according to a second embodiment of the present invention.
Figure 5:
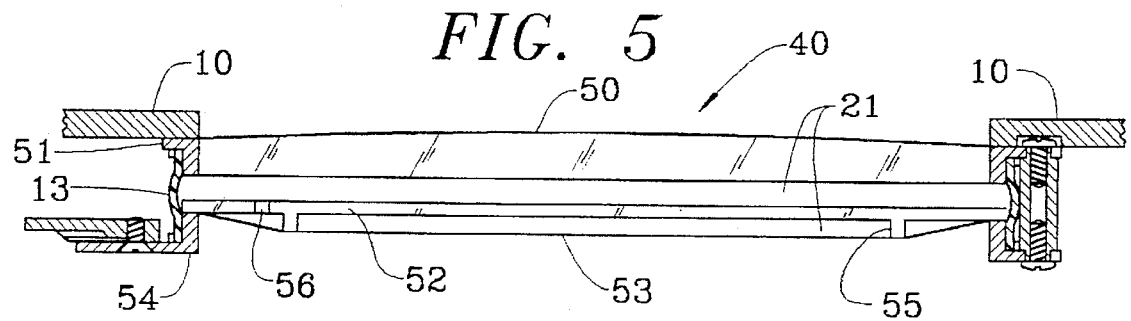
FIG. 5 is a cross sectional view of the right eye lens from the spectacles shown in FIG. 4, taken at 5—5 of FIG. 4, and showing the lens adjusted for distance viewing.

FIGS. 4 and 5 depict a second embodiment of a lens according to the invention (indicated by the numeral 40), which, for purposes of illustration, are according to the alternate construction mentioned in the previous paragraph; namely, the construction where the rigid lens 50, instead of being the movable member, is attached to a front ring 51, which in turn is attached to frame 10. The transparent membrane support 52, in this embodiment, is movable with respect to the frame 10 in the same manner as was the rigid lens in the first embodiment. In FIG. 5, where the lens is set for distance viewing, the optically active portion of the membrane is shown flat, for purposes of illustration, rather than concave as was shown in FIG. 2. This alternate membrane configuration was discussed above.

The membrane 53 in this second embodiment is bonded around its periphery to the membrane support 52 and to rear ring 54. A raised circular ridge 55 projects from the membrane support 52 and supports the membrane away from the body of the membrane support. The membrane may or may not be bonded to the ridge. Holes 56 through the membrane support allow the filling liquid 21 to pass through the membrane support as the support is moved. Channels 57 allow the filling liquid to pass in and out of the central area of the space between membrane support 52 and membrane 53. Since the raised ridge 55 is circular, distensions of the membrane will be essentially spherical irrespective of the shape of the periphery of the membrane. As illustrated in FIG. 4, there are four channels 57 separating four portions of the ridge 55. It will be understood that there could be few or many channels 57, and that the lands of ridge 55 could be large or relatively small, i.e., ridge 55 could, for example, be comprised of a series of small raised dots, or, on the other hand, of a continuous ridge. In the latter case, one or more holes 56 interior of the ridge could be used to allow liquid flow to and from the center portion.

Figure 6:
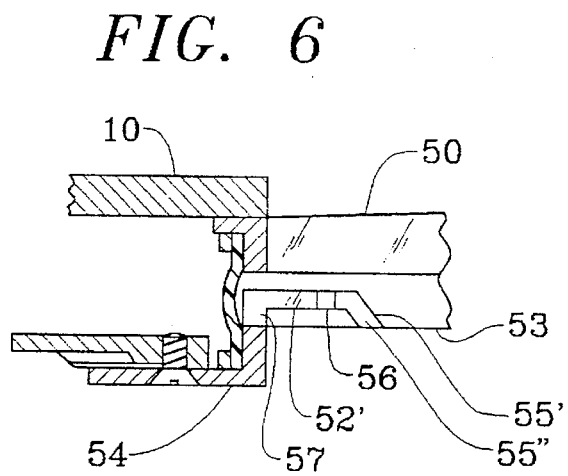
FIG. 6 is a fragmentary view showing a variant of the membrane support of FIG. 5.

FIG. 6 illustrates a variant of the membrane support 52 shown in FIG. 5. The membrane support 52' of FIG. 6 is different from the membrane support 52 in three particulars, any one, or ones of which may be adopted in the construction of a variable focus lens according to the invention. The first difference is that the opening 55' extends completely through the membrane support, rather than merely part way; the second is that the opening is tapered, rather than cylindrical; and the third is that there is a lip on the periphery of the membrane support so that the membrane does not taper downward outside the ridge 55" as in the construction of FIG. 5.

Figure 7:
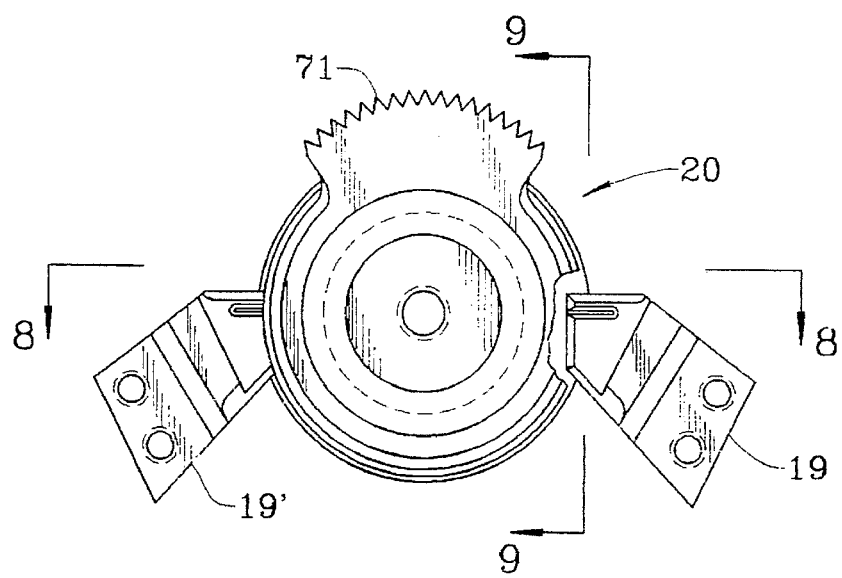
FIG. 7 is a rear view of an actuator assembly for use in connection with the invented variable focus lenses in the context of spectacles.
Figure 8:
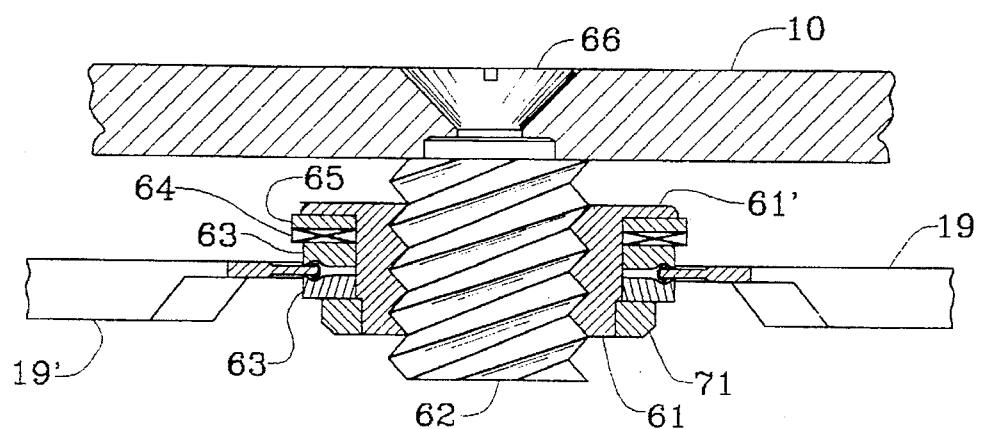
FIG. 8 is a cross sectional view of the actuator of FIG. 6, taken at 8—8 of FIG. 7.
Figure 9:
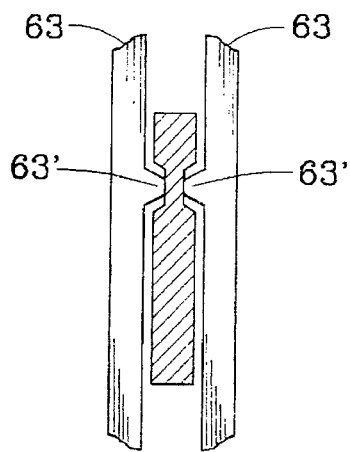
FIG. 9 is a fragmentary view of the actuator of FIG. 6, taken at 9—9 of FIG. 7.

Details of the presently preferred means for adjusting the focal length of the invented lenses in the context of a pair of spectacles (actuator 20) are shown in FIGS. 7 through 9. Linear motion which is imparted to adjusting tabs 19 and 19' by the actuator 20 is created by rotating nut 61 around threaded stud 62. Knurled finger-wheel 71, which is the element engaged by the wearer to adjust the focal length, is pressed onto nut 61. Two "point washers" 63, a wave spring 64, and a shim 65 are located in the space between the finger wheel 71 and flange 61' of nut 61. Each point washer 63 has two diametrically opposed points projecting from one of its faces which engage mating grooves in adjusting tabs 19 and 19' As nut 61 is rotated by the wearer's finger pressure on finger wheel 71, the point washers remain rotationally stationary, but move axially with respect to threaded stud 62. The linear axial motion is coupled to the adjusting tabs 19 and 19' through the points 63', and the focal length of each lens is thereby changed. Transmitting the displacement force to adjusting tabs 19 and 19' through the points 63' assures that no twisting couple (which would tend to twist the rear ring 17 and thereby introduce optical distortion) is transmitted to the lens assembly. In addition, the point type of coupling between the actuator and the adjusting tabs minimizes any uncertainty in the points of application of force to the lenses, which assures that they will track optically as their focal lengths are changed.

The threaded stud 62 is held to frame 10 by screw 66. The angular position of stud 62 may be set on assembly to the position which locates adjusting tabs 19 and 19' as desired with respect to the angular position of finger wheel 71.

It will be appreciated that the actuator as described above is capable of exerting actuation forces in either direction, and hence is suitable for use with a lens wherein the membrane shape changes from concave to convex within its range of operation. If a construction is used wherein the membrane is always convex (or always concave), the actuation force may not reverse direction during operation, and in such case, only one point washer may be found to be sufficient.

What has been invented are spectacles which utilize liquid filled variable focus lenses wherein distortions, which might otherwise occur due to non-circularity of the lenses, are substantially reduced. Various modifications and adaptations of the invention will no doubt occur to those skilled in the art. Such modifications and adaptations as are within the terms and spirit of the following claims are intended to be covered thereby.

We claim:

1. A variable focal length lens which comprises:

a rigid lens;

a membrane support member positioned across the field of view of said rigid lens and spaced therefrom, said membrane support member having a central portion including support means which supports a transparent distensible membrane whereby said membrane has a substantially circular free area, wherein said support means is in the form of a raised ridge projecting outward from a surface of said membrane support member, said membrane being positioned against said support means and being maintained at all times in contact with said support means in the region of said support means adjacent to said free area of said membrane;

a transparent liquid filling the space between said rigid lens and said membrane;

flexible sealing means for retaining said transparent liquid between said rigid lens and said membrane; and variable spacing means acting between said rigid lens and said membrane support member for adjusting the spacing between said membrane support member and said rigid lens.

2. A variable focal length lens which comprises:

a rigid lens;

a membrane support member positioned across the field of view of said rigid lens and spaced therefrom, said membrane support member having a central portion including support means which supports a transparent distensible membrane whereby said membrane has a substantially circular free area, wherein said support means is comprised of the area surrounding a substantially circular opening in a surface of said membrane support member and said membrane is not attached to the area of said membrane support member which comprises said support means, said membrane being positioned against said support means and being maintained at all times in contact with said support means in the region of said support means adjacent to said free area of said membrane;

a transparent liquid filling the space between said rigid lens and said membrane;

flexible sealing means for retaining said transparent liquid between said rigid lens and said membrane; and variable spacing means acting between said rigid lens and said membrane support member for adjusting the spacing between said membrane support member and said rigid lens.

3. A variable focal length lens as recited in claim 2 wherein said surface of said membrane support member is convexly shaped.

4. A variable focal length lens which comprises:

a rigid lens;

a membrane support member positioned across the field of view of said rigid lens and spaced therefrom, said membrane support member having a central portion including support means which supports a transparent distensible membrane whereby said membrane has a substantially circular free area, where said central portion of said membrane support is transparent and has substantially the same refractive index as said transparent liquid, said membrane being positioned against said support means and being maintained at all times in contact with said support means in the region of said support means adjacent to said free area of said membrane;

a transparent liquid filling the space between said rigid lens and said membrane;

flexible sealing means for retaining said transparent liquid between said rigid lens and said membrane; and variable spacing means acting between said rigid lens and said membrane support member for adjusting the spacing between said membrane support member and said rigid lens, said membrane support member and said rigid lens being hingedly connected, and said variable spacing means acting between said membrane support and said rigid lens remote from said hinge.

5. A variable focal length lens which comprises:

a rigid lens;

a membrane support member positioned across the field of view of said rigid lens and spaced therefrom, said membrane support member having a central portion including support means which supports a transparent distensible membrane whereby said membrane has a substantially circular free area, wherein said support means is in the form of a raised ridge projecting outward from a surface of said membrane support member, said membrane being positioned against said support means and being maintained at all times in contact with said support means in the region of said support means adjacent to said free area of said membrane;

a transparent liquid filling the space between said rigid lens and said membrane;

flexible sealing means for retaining said transparent liquid between said rigid lens and said membrane; and variable spacing means acting between said rigid lens and said membrane support member for adjusting the spacing between said membrane support member and said rigid lens, said membrane support member and said rigid lens being hingedly connected, and said variable spacing means acting between said membrane support and said rigid lens remote from said hinge.

6. A variable focal length lens as recited in claim 5 where said central portion of said membrane support is transparent and has substantially the same refractive index as said transparent liquid.

7. A variable focal length lens which comprises:

a rigid lens;

a membrane support member positioned across the field of view of said rigid lens and spaced therefrom, said membrane support member having a central portion including support means which supports a transparent distensible membrane whereby said membrane has a substantially circular free area, wherein said support means is comprised of the area surrounding a substantially circular opening in a surface of said support member and said membrane is not attached to the area of said membrane support member which comprises said support means, said membrane being positioned against said support means and being maintained at all times in contact with said support means in the region of said support means adjacent to said free area of said membrane;

a transparent liquid filling the space between said rigid lens said membrane;

flexible sealing means for retaining said transparent liquid between said rigid lens and said membrane; and variable spacing means acting between said rigid lens and said membrane support member for adjusting the spacing between said membrane support member and said rigid lens, said membrane support member and said rigid lens being hingedly connected, and said variable spacing means acting between said membrane support and said rigid lens remote from said hinge.

8. A variable focal length lens as recited in claim 7 wherein said surface of said membrane support member is convexly shaped.

9. A variable focal length lens as recited in claim 8 where said central portion of said membrane support is transparent and has substantially the same refractive index as said transparent liquid.

* * * * *

UNITED STATES PATENT AND TRADEMARK OFFICE
CERTIFICATE OF CORRECTION

PATENT NO. : 5,668,620
DATED : September 16, 1997
INVENTOR(S) : Stephen Kurtin, et. al.

It is certified that error appears in the above-identified patent and that said Letters Patent is hereby corrected as shown below:

On title page, item [76] should read as follows:
--Stephen Kurtin, 3835 Kingswood Rd., and
Saul Epstein, 14558 Deervale Pl., both of Sherman Oaks, Calif. 91403--

Signed and Sealed this

Sixteenth Day of December, 1997

Attest:

BRUCE LEHMAN

Attesting Officer

Commissioner of Patents and Trademarks